United States Patent
Ahlgren et al.

(10) Patent No.: US 10,221,524 B2
(45) Date of Patent: Mar. 5, 2019

(54) DISCHARGE VALVE WITH A DETACHABLE INNER LINING

(71) Applicant: Valmet AB, Sundsvall (SE)

(72) Inventors: Örjan Ahlgren, Sundsvall (SE); Per Nyberg, Sundsbruk (SE)

(73) Assignee: Valmet AB (SE)

( * ) Notice: Subject to any disclaimer, the term of this patent is extended or adjusted under 35 U.S.C. 154(b) by 0 days.

(21) Appl. No.: 15/549,238

(22) PCT Filed: Apr. 12, 2016

(86) PCT No.: PCT/SE2016/050306
§ 371 (c)(1),
(2) Date: Aug. 7, 2017

(87) PCT Pub. No.: WO2016/171604
PCT Pub. Date: Oct. 27, 2016

(65) Prior Publication Data
US 2018/0030652 A1 Feb. 1, 2018

(30) Foreign Application Priority Data
Apr. 22, 2015 (SE) ........................................ 1550479

(51) Int. Cl.
*D21C 7/08* (2006.01)
*F16K 3/24* (2006.01)
*D21C 7/04* (2006.01)

(52) U.S. Cl.
CPC ................. *D21C 7/08* (2013.01); *D21C 7/04* (2013.01); *F16K 3/24* (2013.01)

(58) Field of Classification Search
USPC ........................................................ 162/246
See application file for complete search history.

(56) References Cited

U.S. PATENT DOCUMENTS 2,803,540 A 8/1957 Durant et al.
2,931,393 A 4/1960 Jones
(Continued)

FOREIGN PATENT DOCUMENTS

AU 2007214339 B2 7/2014
EP 2725134 A1 4/2014

OTHER PUBLICATIONS

International Search Report for Application No. PCT/SE2016/050306, dated Jun. 14, 2016.

*Primary Examiner* — Mark Halpern
(74) *Attorney, Agent, or Firm* — Lerner, David, Littenberg, Krumholz & Mentlik, LLP

(57) ABSTRACT

A discharge valve is disclosed which includes a valve housing which can be functionally connected to a process element having a pressurized interior space. The valve housing includes a flow channel having a longitudinal center axis (A) and is in working cooperation with a valve member. The flow channel is arranged to be in fluid communication with the pressurized interior space in the process element after the discharge valve has been connected to the process element. The valve member is displaceable between an open position and a closed position in a displacement direction (B) whereby the discharge valve can be opened and closed. The flow channel comprises a detachable inner lining having an envelope wall, and the detachable inner lining comprises an aperture extending through the envelope wall and through which the valve member is adapted to run when being displaced between the opened and closed positions.

15 Claims, 6 Drawing Sheets

(56) References Cited

U.S. PATENT DOCUMENTS

| | | |
|---|---|---|
| 3,579,421 A | 5/1971 | Richter |
| 4,073,308 A | 2/1978 | Stith, Jr. |
| 4,184,507 A | 1/1980 | Richards |
| 2007/0175520 A1 | 8/2007 | Eemisse |

DISCHARGE VALVE WITH A DETACHABLE INNER LINING

CROSS-REFERENCE TO RELATED PATENT APPLICATIONS

The present application is a national phase entry under 35 U.S.C. § 371 of International Application No. PCT/SE2016/050306 filed Apr. 12, 2016, published in English, which claims priority from Swedish Application No. 1550479-8 filed Apr. 22, 2015, all of which are incorporated herein by reference.

TECHNICAL FIELD

The invention pertains to a discharge valve, in particular a discharge valve for use in a manufacturing process involving processing of lignocellulosic material, such as a pulp manufacturing processes or a process for manufacturing bio fuel. The discharge valve comprises a valve housing which is connectable to a process element having a pressurized interior process volume. The valve housing comprises a flow channel which is in working cooperation with a valve member, and which is arranged to be in fluid communication with the pressurized interior process volume of the process element after the discharge valve has been connected to the process element. The valve member is arranged to be displaced in the flow channel in a displacement direction at an angle to a longitudinal centre axis of the flow channel, such that the valve member can be moved between a fully open position and a fully or partially closed position along the displacement direction.

BACKGROUND

In the process industry and, in particular, in the biomass process industry such as in pulp manufacturing and in the manufacturing of bio fuels, discharge valves are used to control the pressure and/or process flow in process elements such as boilers, reactors and refiners which have inner pressurized process chambers. Shutter valves, gate valves and ball sector valves are the most commonly used types of discharge valves in the pulp manufacturing industry. The process flows in a process involving processing of lignocellulosic materials are generally corrosive, of a high temperature and with a high content of abrasive particulate material such as cellulose fibers and fragments and impurities following with the processed material. Consequently, a discharge valve being continuously exposed to a pressurized flow of hot, abrasive and corrosive material will wear out over time and will have to be replaced by a new valve. This is costly and, in addition, involves lengthy stop-times in the process as the process will have to be interrupted while the process equipment cools down and is cleaned so that the worn-down discharge valve can be disconnected from all couplings and a new discharge valve can be mounted in the place of the discarded valve.

It is therefore an object of the invention to provide a discharge valve having a more robust construction and longer service life. A further object of the invention may be to reduce process stop-times caused by valve maintenance. Yet another object may be to offer a discharge valve having greater versatility than previously used discharge valves.

SUMMARY

According to the invention, there is offered a discharge valve, in accordance with claim 1. Further embodiments are set out in the dependent claims.

The discharge valve as disclosed herein comprises a valve housing which is connectable to a process element, the process element having a pressurized interior process volume. The discharge valve comprises a flow channel having a longitudinal centre axis, A, and being in working cooperation with a valve member, the flow channel being arranged to be in fluid communication with the pressurized interior process volume of the process element after connection thereto. The valve member comprises an insertion part which is insertable in the flow channel by displacement of the valve member in a displacement direction, B, at an angle, α, to the longitudinal centre axis, A.

The flow channel is at least partly formed by a detachable inner lining having an envelope wall, wherein the detachable inner lining comprises an aperture extending through the envelope wall and through which opening the valve member is adapted to run when being displaced in the displacement direction, B.

The discharge valve as disclosed herein may be a discharge valve adapted for connection to an outlet of a pressurized process element in any biomass processing system involving evacuation of material from pressurized processing voids, such as found in refiners, boilers and reactors or may be a discharge valve connected to an outlet of a pressurized process element in any biomass processing system involving evacuation of material from pressurized processing voids, such as found in refiners, boilers and reactors. Biomass processing systems may be found e.g. in cellulose pulp manufacturing processes and in bioplants for the production of biofuels such as ethanol and biodiesel. Such processes involve processing lignocellulosic raw materials derived from perennial plants such as trees as well as annual plants such as sugar cane, straw, hemp, etc.

The detachable inner lining as disclosed herein may have a generally tubular shape with an inner envelope wall surface defining the shape of the flow channel in the discharge wall and an outer envelope wall surface which is arranged to face the valve housing and which is adapted to cooperate with the valve housing when attaching the detachable inner lining in the valve housing. As used herein, an element having a tubular shape is an elongate, hollow element having an inner longitudinally extending channel and an outer wall surrounding the inner channel. The tubular element may have any cross-sectional shape, such as square, rectangular, circular, etc. The cross-sectional shape of the tubular element may vary along the length of the element.

The detachable inner lining is arranged to be removed from the valve housing and may be arranged to be reattached to the valve housing and/or to be replaced by another detachable inner lining. The discharge valve is arranged to be coupled to a process element at an inlet end of the discharge valve. The discharge valve may be directly coupled to the process element or may be indirectly coupled to the process element by being placed downstream of the process element in a feed system with one or more intervening pipe sections between the discharge valve and the outlet from the pressurized process element. The inlet end of the discharge valve is the end of the discharge valve which will be directed towards the outlet from the pressurized process element when the discharge valve is coupled to the pressurized process element. The inlet end of the discharge valve is the end through which the pressurized process flow which may contain fibres, particles and corrosive components will enter the discharge valve. When the discharge valve is in use, the detachable inner lining forming the flow channel will gradually be worn away. Depending on the flow profile through the discharge valve, the inner wall of the detachable inner lining will be exposed to uneven wear. The size of the flow through the flow channel may be regulated by moving the insertion part of the valve member into the flow channel so that the cross-sectional area of the flow channel is diminished by the valve member. During normal operation of the discharge valve, a portion of the insertion part of the valve member will be located in the flow channel and will be hit by the process flow, causing the process flow to be deflected towards the wall of the detachable inner lining downstream the valve member. This means that the parts of the discharge valve which are most exposed to mechanical wear and corrosion caused by the process flow are the upstream side of the insertion part of the valve member and the part of the inner wall of the detachable inner lining which is located downstream of the valve member and which faces towards the end surface of the valve member. Accordingly, the most wear of the inner lining will generally be found directly after the valve member or throttle.

By providing the discharge valve with a detachable inner lining, it has been found that the useful life of the discharge valve may be considerably extended by merely replacing a worn-down detachable inner lining with a new detachable inner lining without having to replace the whole discharge valve.

It may be preferred that the detachable inner lining has a symmetrical shape allowing the detachable inner lining to be detached from the flow channel, turned back-to-front, and inserted again into the valve housing. In other words, the detachable inner lining may have an end-to-end shape such that it can be taken out of the valve housing, be rotated 180 degrees about an axis perpendicular to the longitudinal centre axis, A, and be reattached in the valve housing in the new direction. By designing the detachable inner lining such that it can be applied in the valve housing with any one of the two opposing ends of the detachable inner lining at the inlet end of the discharge valve, the working life of the detachable inner lining may be considerably extended as different parts of the detachable inner lining may be exposed to wear during use of the discharge valve. When the end of the detachable inner lining which is initially placed at the outlet end of the discharge valve has been worn down, the detachable inner lining can be removed from the valve housing, turned around and inserted with the opposite non-worn end placed at the outlet end of the discharge valve.

The discharge valve as disclosed herein may be arranged to be adapted to different process demands by selecting a detachable inner lining adapted to the particular process conditions at hand. Accordingly, a range of detachable inner linings may be provided with inner linings having been designed with particular regard to one or more process conditions. Accordingly, the inner linings may be provided with one or more of high temperature resistance, chemical resistance, wear resistance etc. It is further possible to provide inner linings having flow channels of different sizes and/or different shapes. By offering a wide selection of inner linings, the discharge valve as disclosed herein may easily be adapted to process flows of different compositions and/or different flow rates.

The envelope wall of the detachable inner lining constitutes a replaceable inner wear surface in the discharge valve. For a given lining material, the greater the thickness is of the envelope wall of the detachable inner the higher is the wear resistance and thereby the longer is the service life of the detachable inner lining. The envelope wall of the detachable inner lining may have a thickness of from 2-100 mm, preferably from 5-80 mm, more preferably from 10-50 mm. The envelope wall thickness can be 5, 10, 15, 20, 25, 30, 35, 40 or 45 mm, for example.

The inner lining of the discharge valve as disclosed herein may have an inner diameter and the insertion part of the valve member may have a diameter, wherein the inner diameter of the detachable inner lining is smaller than the diameter of the insertion part of the valve member.

The flow channel which is defined by the inner diameter of the detachable inner lining may have a diameter ranging from 5 mm for small scale processes such as laboratory scale processes up to 300 mm for large scale processes. The inner diameter of the detachable inner lining may preferably be from 30-200 mm. An inner diameter of the detachable inner lining can be 50, 60, 70, 80, 90, 100, 110, 120, 130 or 140 mm, for example. As set out herein, the inner diameter of the detachable inner lining and thereby the diameter of the flow channel may vary along the longitudinal axis A. The inner diameter of a detachable inner lining or of a part of a detachable inner lining having a non-circular cross-section is the diameter of the largest circle which can be inscribed within the cross-sectional area of flow channel.

The discharge valve as disclosed herein is a throttle valve and the valve member or throttle may be a plunger which is inserted into the flow channel at an angle, $\alpha$, to the flow channel to fully or partly close the flow channel. In the first instance, after insertion of the valve member into the flow channel, the flow in the flow channel will be completely blocked while a partly inserted valve member will only serve as a throttle and restrict the flow in the flow channel. The valve member is moved into and out of the flow channel in the displacement direction, B, which is arranged at the angle, $\alpha$, with respect to the longitudinal centre axis, A, of the flow channel, wherein the angle, $\alpha$, may be from 30-150 degrees, preferably from 45-135 degrees, more preferably from 80-100 degrees, and most preferably 90 degrees or substantially 90 degrees.

As set out herein, the valve member may have the form of a cylindrical body, as a cylindrical rod or tube, wherein the cylindrical body preferably has a circular cross section. A cylindrically shaped valve member may be preferred as it provides better sealing of the flow channel than other types of valve members. The valve member is preferably solid at least in the insertion part of the valve member which is positioned in the flow channel when the valve member is in the closed position or in a throttle position. This is the part of the valve member which will be most exposed to wear during use of the discharge valve. A solid valve member provides better wear resistance than a non-solid valve member and will have a longer service life than a non-solid valve member. The valve member may be a replaceable part of the discharge valve and/or may be arranged such that it can be rotated to expose different surfaces to wear from a process flow. Rotation may be arranged to be carried out manually or by means of a motor. Here it should be appreciated that such rotational movement of the valve member, to expose different surfaces thereof to wear from a process flow, is independent of moving the valve member into and out from the flow channel.

The detachable inner lining may comprise a mating surface and the valve member may be adapted to be positioned such that it abuts the mating surface of the detachable inner lining when the valve member is in a fully closed position. Accordingly, the mating surface may be configured such that it will mate with a corresponding mating surface arranged at an outer end of the insert part of the valve member and thereby form a closure between the envelope wall of the detachable inner lining and the outer end of the valve member.

The mating surface on the detachable inner lining may be formed by a recess in the envelope wall of the detachable inner lining and may be a recess having a circular periphery corresponding to a circular periphery of the end of the insert part. The recess and the end of the insert part may have a curvature in order to conform to an inner curvature of the valve housing and/or the detachable inner lining.

An adequate closure between the outer end of the insert part of the valve member and the inner lining may be obtained without a recess in the envelope wall of the detachable inner lining by only providing the outer end of the valve member with a profiled surface matching a profile of the inner surface of the detachable inner lining. By way of example, if the inner lining has an inner surface with a circular cross section, the valve member may be provided with a correspondingly curved outer end.

In the discharge valve as disclosed herein, the valve member may be arranged such that it can be displaced out of the flow channel, to a position in which it is clear from the detachable inner lining. This means that the valve member may be moved in the displacement direction, B, until it is not only completely retracted from the flow channel but moved away from the flow channel in the displacement direction, B, at least a further distance corresponding to the thickness of the envelope wall of the detachable inner lining. By positioning the valve member in the fully retracted service position, where it is clear from the detachable inner lining, the detachable inner lining can be removed from the valve housing without needing to completely disassemble the discharge valve.

The described discharge valve may be particularly useful when discharging from pressurized interior spaces, such as pressurized chambers, such as during a steam explosion pulp manufacturing process.

BRIEF DESCRIPTION OF THE DRAWINGS

The present invention will be further explained hereinafter by means of non-limiting examples and with reference to the appended drawings wherein.

DETAILED DESCRIPTION

It is to be understood that the drawings are schematic and that individual components, are not necessarily drawn to scale. The discharge valve shown in the figures is provided as an example only and should not be considered limiting to the invention. Accordingly, the scope of the invention is determined solely by the appended claims.

Although described as implemented in connection to refiner in a pulping process, the teachings of the current disclosure are equally applicable to other systems (hot or cold) in which abrasive material is evacuated from a pressurized process chamber into a pipe, open air or into another process chamber. As the abrasiveness of a material depends on both the material itself as well as the surrounding environment, the term abrasive is used to describe the processing of a material in which process the material can be regarded as abrasive. As an example, at a low temperature a material might not be viewed as being abrasive whereas at a higher temperature, the abrasive wear of the material is clearly increased.

A general system in which the present disclosure can be beneficial implemented may include a pressurized process space such as a process chamber or container into which material is introduced at one end and subjected to e.g. boiling, steaming or other hot or cold process. The material is transported within the processing chamber and evacuated at an outlet in another end of the chamber. The evacuated material is then transported through a system of pipes to subsequent processing arrangements. The teachings of the current disclosure are beneficially implemented at the outlet of the pressurized processing chamber. Examples of such a pressurized processing container include a boiler, steamer, refiner for pulp, impregnator, vertical or horizontal reactors, etc.

Figure 1:
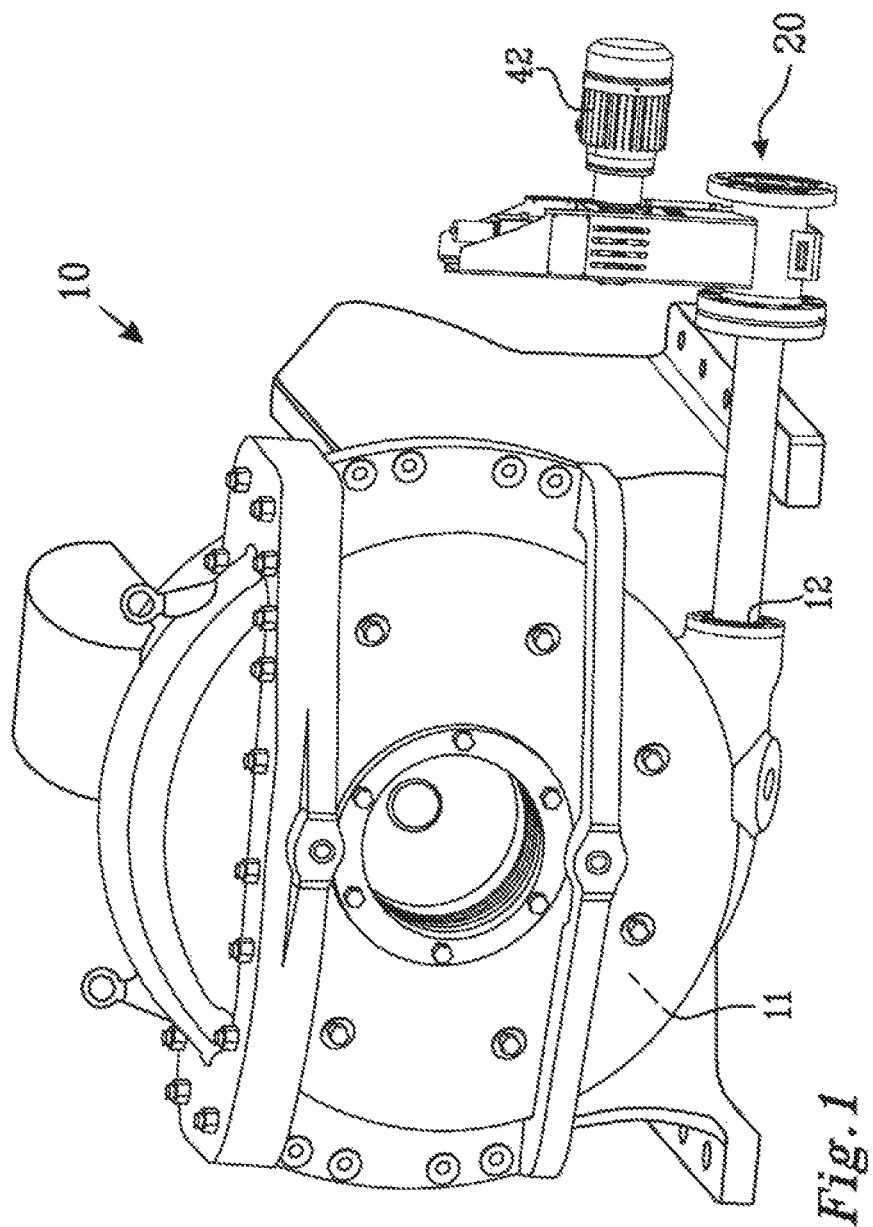
FIG. 1 shows a refiner and a discharge valve according to an embodiment of the present invention.

FIG. 1 shows a refiner 10 for a pulp manufacturing process and specifically a mechanical pulping process. Generally wood chips are washed, pre-treated with heat and/or a chemical pretreatment and refined to pulp. The wood chips are fed between two disks in a refiner, such as the refiner 10 having an interior process volume 11, wherein the wood chips are ground to pulp. A discharge valve 20 is connected to an outlet 12 of the refiner 10. During processing in the refiner 10, pressure and heat are built up putting the discharge valve 20 under a lot of strain and wear as the discharge valve 20 is opened and pressurized pulp is discharged through the discharge valve 20. The discharge valve 20 will be described in greater detail below.

Figure 2:
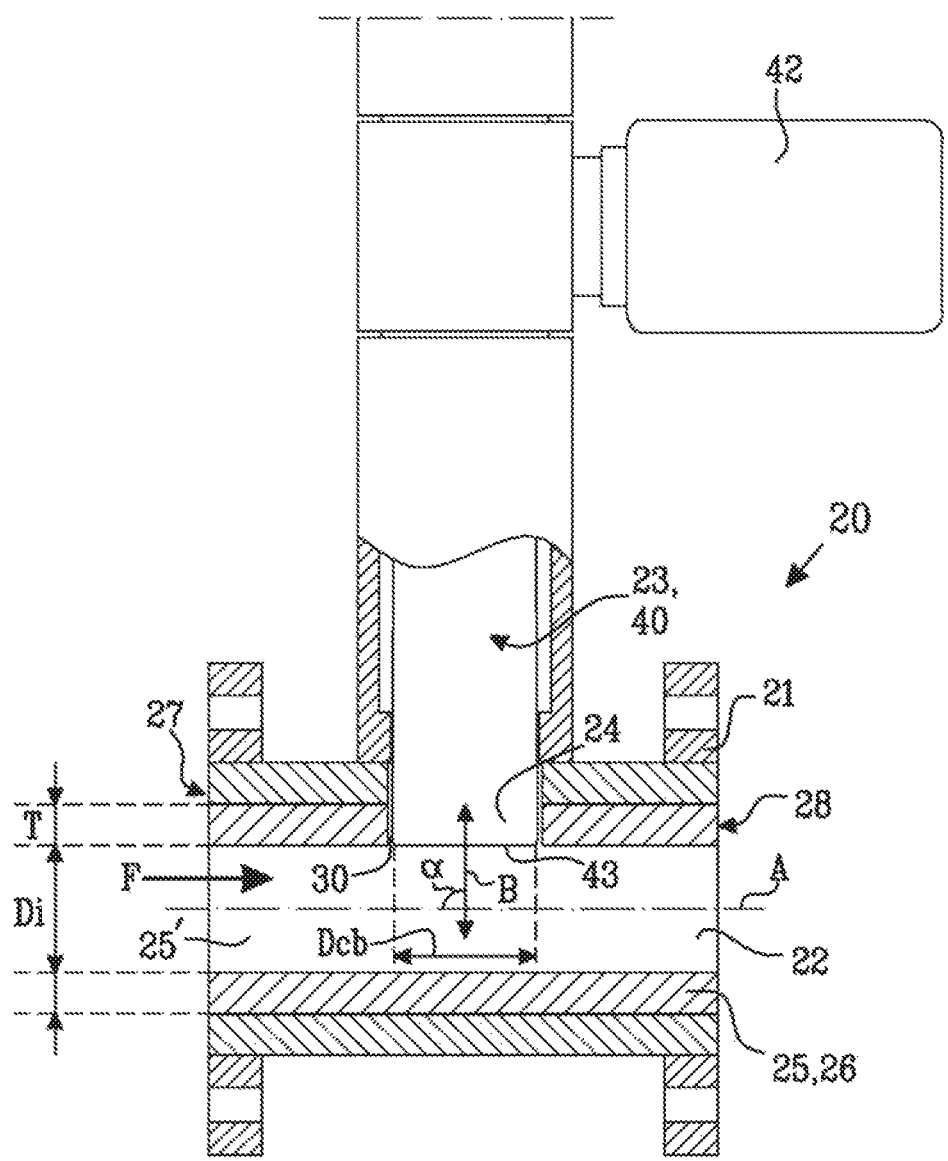
FIG. 2 shows a cross sectional view of the discharge valve of FIG. 1, with a valve member being in a fully open position.

FIG. 2 shows a cross sectional view of the discharge valve 20 when the discharge valve 20 is in a fully open position. FIG. 2 shows a valve housing 21 comprising a flow channel 22 through which the pressurized pulp suspension can flow in a first flow direction indicated by the arrow in FIG. 2 when the discharge valve 20 is opened. The flow channel 22 has a longitudinal centre axis A. A valve member 23, shown in a retracted position where the flow channel 22 is completely unrestricted by the valve member 23 is arranged along a displacement direction indicated by the arrow B in FIG. 2 to thereby provide a valve function to the discharge valve 20.

A detachable inner lining 25 is applied inside the valve housing 21 and defines the shape and size of the flow channel 22. The detachable inner lining 25 is detachable in the sense that it can be removed from the valve housing 21 without destroying or damaging the valve housing 21. The detachable inner lining 25 is thus intended to be replaceable, the valve housing 21 is thus adapted to have a replaceable detachable inner lining 25. The detachable inner lining 25 can be replaced by another detachable inner lining, or the detachable inner lining 25 can be inserted back again, e.g. after having been turned back-to-front. The detachable inner lining 25 can be press fitted into the valve housing 21, or be attached by other means such as via brackets and/or screws (not shown). A further alternative is that the detachable inner lining 25 is fixed in position by flange connections connecting the discharge valve to other elements in the process equipment such as pipes, a process chamber outlet, etc.

The detachable inner lining 25 as shown in the figures, has a circular cross section formed by an envelope wall 25 having a thickness T. Other cross-sectional shapes may alternatively be used, as set out herein. The detachable inner lining 25 can be said to have a generally tubular shape with an inner envelope wall surface 25' which defines the shape of the flow channel 22. As set out herein, a suitable envelope wall thickness can be from 2-100 mm, preferably from 5-80 mm, more preferably from 10-50 mm. In the shown embodiment, the envelope wall thickness is 30 mm. The length of the flow channel 22 is defined between an inlet end 27 and an outlet end 28. In the drawings, the length of the detachable inner lining 25 is shown to correspond to the length of the flow channel 22 of the valve housing 21. Alternatively, the length of the detachable inner lining 25 does not have to be exactly the same length as the length of the flow channel 22 in the valve housing 21. Accordingly, the inner lining 25 can be shorter or longer than the flow channel 22 of the valve housing 21. It may generally be preferred that the inner lining 25 has a length which is at least 90% of the length of the flow channel 22 in the valve housing 21 in order to adequately protect the inner wall of the valve housing 21 from wear during use. The detachable inner lining 25 has an inner diameter Di defining the diameter of the flow channel 22. As set out herein, the inner diameter Di of the detachable inner lining 25 can be from 5 to 300 mm, preferably from 30-150 mm. The inner diameter of the detachable inner lining 25 is in the shown embodiment 70 mm.

Figure 3:
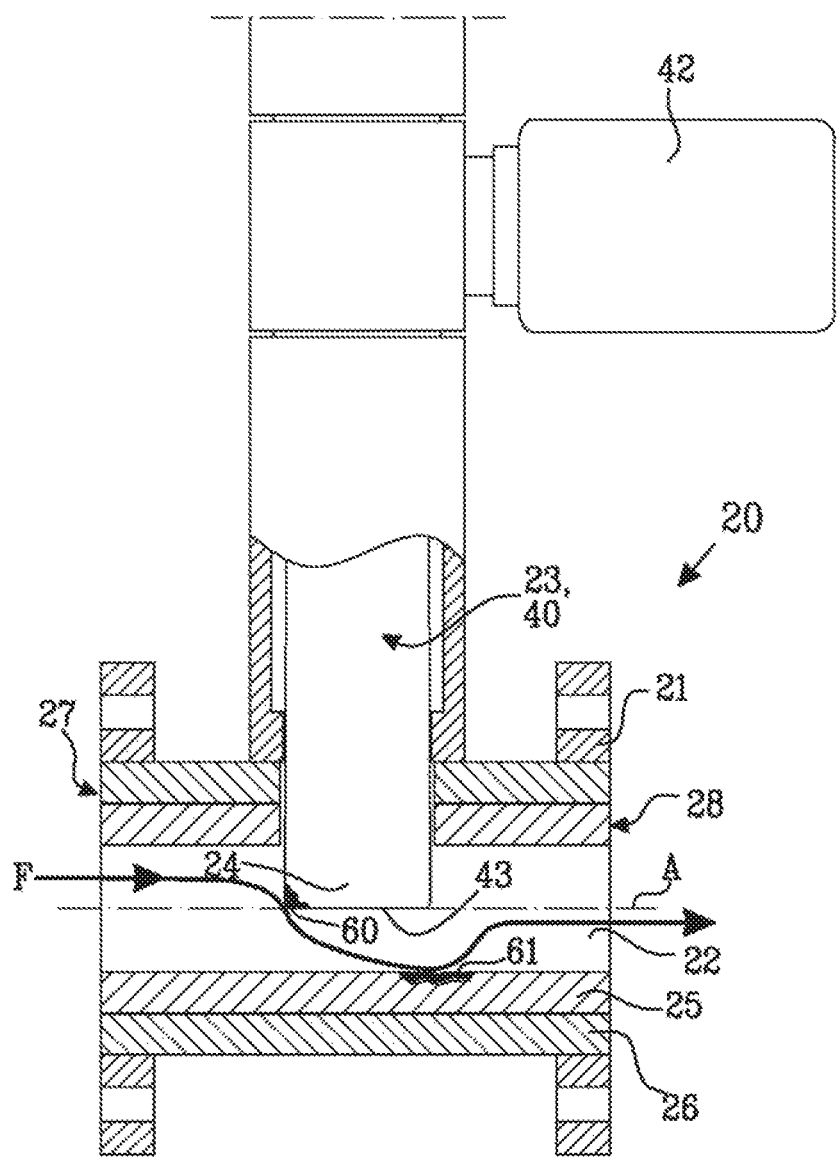
FIG. 3 shows a discharge valve in a partly opened position with a valve member positioned between a fully open position and a completely closed position.
Figure 4:
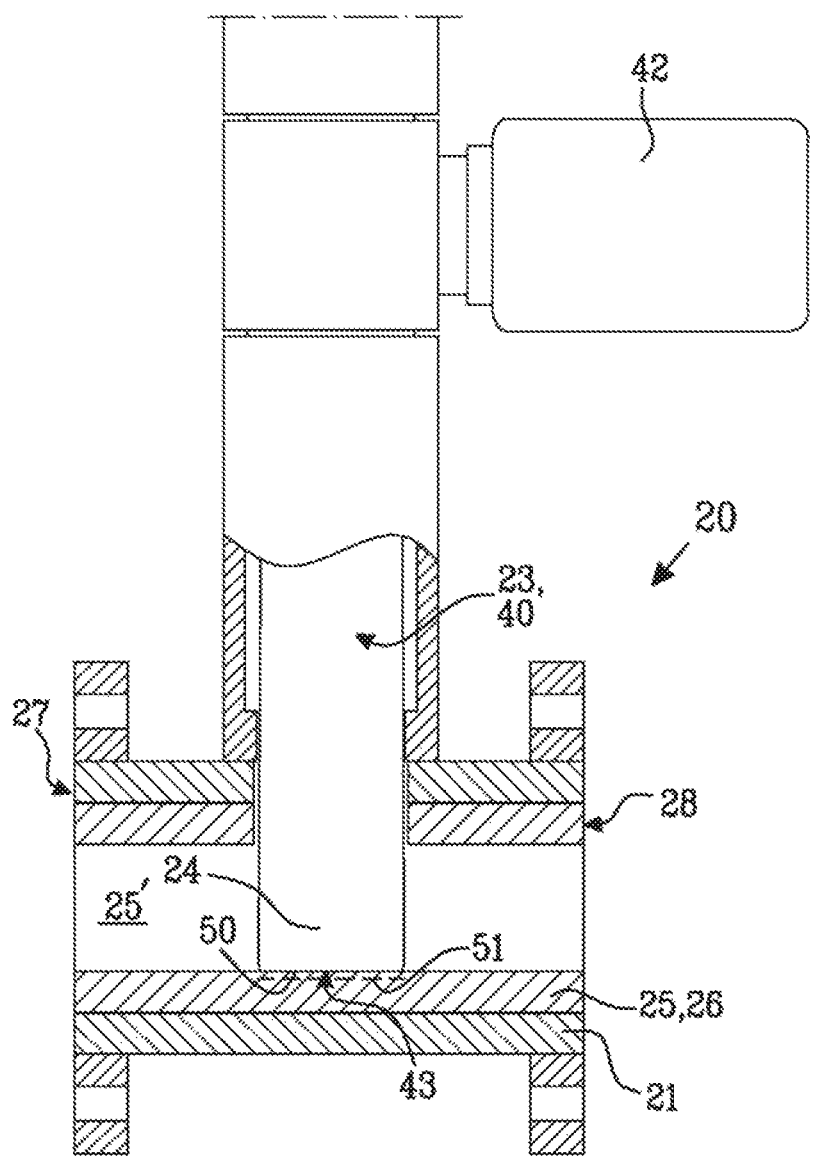
FIG. 4 shows a discharge valve with a valve member in a completely closed position.
Figure 6:
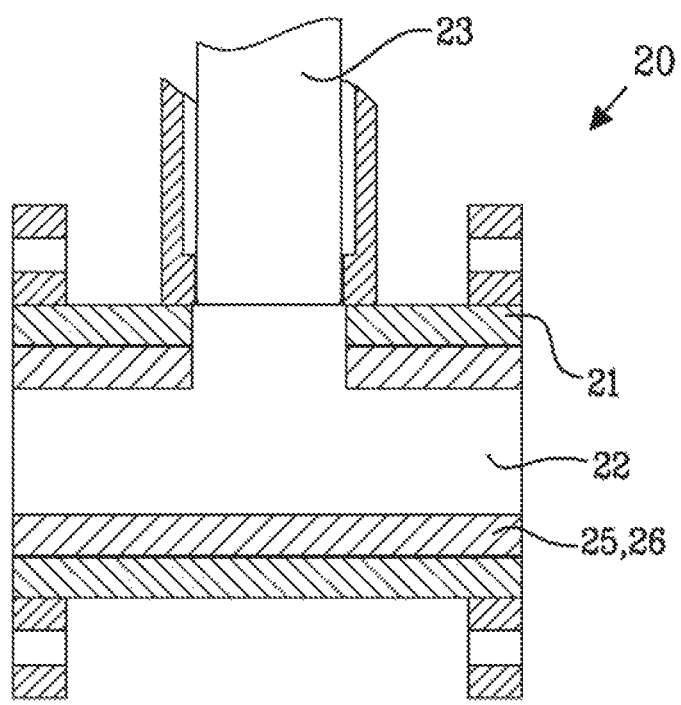
FIG. 6 shows a cross sectional view of a discharge valve 23 in a service position.

As is noticeable in FIG. 2, the detachable inner lining 25 is provided with an aperture 30 through which an insertion part 24 of the valve member 23 is inserted into the valve housing 21. The aperture 30 extends through the wall of the valve housing 21 and through the whole thickness of the envelope wall 26 of the detachable inner lining 25. The aperture is further aligned with the displacement direction B as indicated in FIG. 2 in order to allow the valve member 23 to be moved between a completely closed position as illustrated in FIG. 4, an intermediate throttle position as representatively illustrated in FIG. 3, and optionally a service position as shown in FIG. 6.

The detachable inner lining 25 may be made from a wear resistant material such as steel and preferably high strength and wear resistant steel.

The insertion part 24 of the valve member 23 in the shown example has the form of a generally cylindrical body 40 having a circular cross section with a diameter Dcb. As set out herein, the insertion part 24 of the valve member 23 may have any suitable cross-sectional shape. The aperture 30 through the valve housing 21 into the flow channel 22 should be sized and shaped such that the insertion part 24 of the valve member 23 can be inserted into the flow channel 22 through the aperture and be moved into and out of the flow channel 22 in the displacement direction B. It may be preferred that the aperture 30 is sized and configured such that the insertion end 24 of the valve member 23 fits snugly in the aperture 30.

The displacement direction B of the valve member 23 extends perpendicular to the longitudinal axis A of the flow channel 22. It should be noted that the displacement direction B forms an angle α to the longitudinal centre axis A of the flow channel 22, as indicated in FIG. 2. In the embodiment shown in the figures, the angle α is 90°, i.e. the valve member 23 is moved in the displacement direction B perpendicular to the longitudinal centre axis A of the flow channel. Alternatively, the valve member 23 may inserted through the housing wall with a tilt, implying that the angle α between the displacement direction B and the longitudinal centre axis A of the flow channel 22 deviates from a 90° angle. If the displacement direction B of the valve member 23 is tilted, the aperture 30 of the envelope wall of the detachable inner lining 25 needs to be adjusted accordingly. As set out herein, the angle α may be from 30-150 degrees, such as from 45-135 degrees, preferably from 80-100 degrees and more preferably 90 degrees or substantially 90 degrees.

The valve member 23 is a wear component of the discharge valve 20 as disclosed herein and is preferably a solid body, such as a solid cylindrical body, as shown in FIG. 2. At least the insertion part 24 of the valve member 23 which during use of the discharge valve 20 may intersect with the flow channel 22, as illustrated in FIGS. 3 and 4, is preferably solid. It should be noted that a solid body can have an attachment portion 41 for attaching the valve member 23 to a drive, such as an electrical motor 42, which is arranged to displace the valve member 23 in the displacement direction B.

As the valve member 23 is a part of the discharge valve 20 which highly exposed to wear during use of the discharge valve 20, it may be preferred that the valve member 23 or at least the insertion part 24 of the valve member can be removed from the valve arrangement and replaced with a new valve member 23 or insertion part 24. The whole valve member 23 or only the insertion part 24 may be arranged such that it can be rotated about its own longitudinal axis either continuously during operation or during maintenance so as to provide a fresh surface towards the fluid flow which has not been subjected to wear. By rotating the insertion part or the whole valve member so that different parts of the valve member is exposed to the abrasive process flow in the flow channel 22, the life span of a specific valve member 23 can be prolonged and the valve member does not need to be replaced as frequently.

FIG. 3 shows the valve member 23 in a partly opened position or a throttle position with the insertion part 24 of the valve member 23 inserted into the flow channel 22 to approximately 50% of the available distance. When in a throttle position, the cross-sectional area of the flow channel 22 is reduced by the valve member 23, thus causing a restriction in the flow path in the flow channel 22. The 50% throttle shown in FIG. 3 is only intended as an illustrative example and it should be understood that the end surface 43 of the insertion part 24 may be located at any level inside the flow channel 22.

During normal operation of the discharge valve 20, when the flow channel 22 is partly blocked by the insertion part 24 of the valve member 23, the process flow will enter the flow channel 22 from the inlet end 27 in the flow direction indicated by the arrow F. When the process flow reaches the inserted part 24 of the valve member 23, it will impinge on the valve member 23 and be deflected towards the envelope wall 26 of the detachable inner lining 25 downstream the valve member 23. This means that the parts of the discharge valve 20 which are most exposed to mechanical wear and corrosion caused by the process flow are the upstream side of the insertion part 24 of the valve member 23 and the part of the envelope wall 26 of the detachable inner lining 25 which is located downstream the valve member 23 and which faces towards the end surface 43 of the valve member 23. Accordingly, the most wear of the inner lining 25 will generally be found directly after the valve member 23 or throttle. When the valve member 23 is in the throttle position shown in FIG. 6, the areas in the flow channel 22 which are most exposed to wear are the lower upstream end area 60 of the insertion part 24 which faces the inlet end 27 of the discharge valve 20 and an area 61 on the envelope wall 26 of the detachable inner lining 25 which is located downstream of the valve member 23, towards the outlet end 28 of the discharge valve 20.

FIG. 4 shows the valve member 23 being in a completely closed position. In the closed position, the valve member 23 seals against the detachable inner lining 25 so that no fluid passes thorough the flow channel 22. FIG. 4 also shows a mating surface 50 arranged on the inner envelope wall surface 25' of the detachable inner lining 25. The mating surface 50 is sized and configured to receive the end surface 43 of the insertion part 24 of the valve member 23, in a sealing manner in order to close the discharge valve 10.

The mating surface 50 may be formed by a recess 51 as illustrated schematically by the dashed line in FIG. 4. The shape of the recess 51 is adapted to receive and mate with the end surface 43 of the valve member 23. The shape of the recess 51 is adapted to correspond to the shape of the end surface 43 of the valve member 23. The shape of the recess 51 may be made to correspond to a circular periphery or any other suitable peripheral shape of the end surface 43 of the insert part 24 of the valve member 23. The recess 51 and the end surface 43 of the insert part 24 may have a curvature in order to conform to the inner curvature of the detachable inner lining 25.

It should be understood that the recess 51 is an optional feature of a discharge valve 20 as disclosed herein. An adequate closure between the outer end surface 43 of the insert part 24 of the valve member 23 and the detachable inner lining 25 may be obtained without a recess 51 in the envelope wall of the detachable inner lining 25 by only providing the outer end surface 43 of the valve member with a profiled surface matching the profile of the mating surface 50 of the detachable inner lining 25. By way of example, if the inner lining has an inner surface with a circular cross-section, the valve member may simply be provided with a correspondingly curved outer end.

Figure 5:
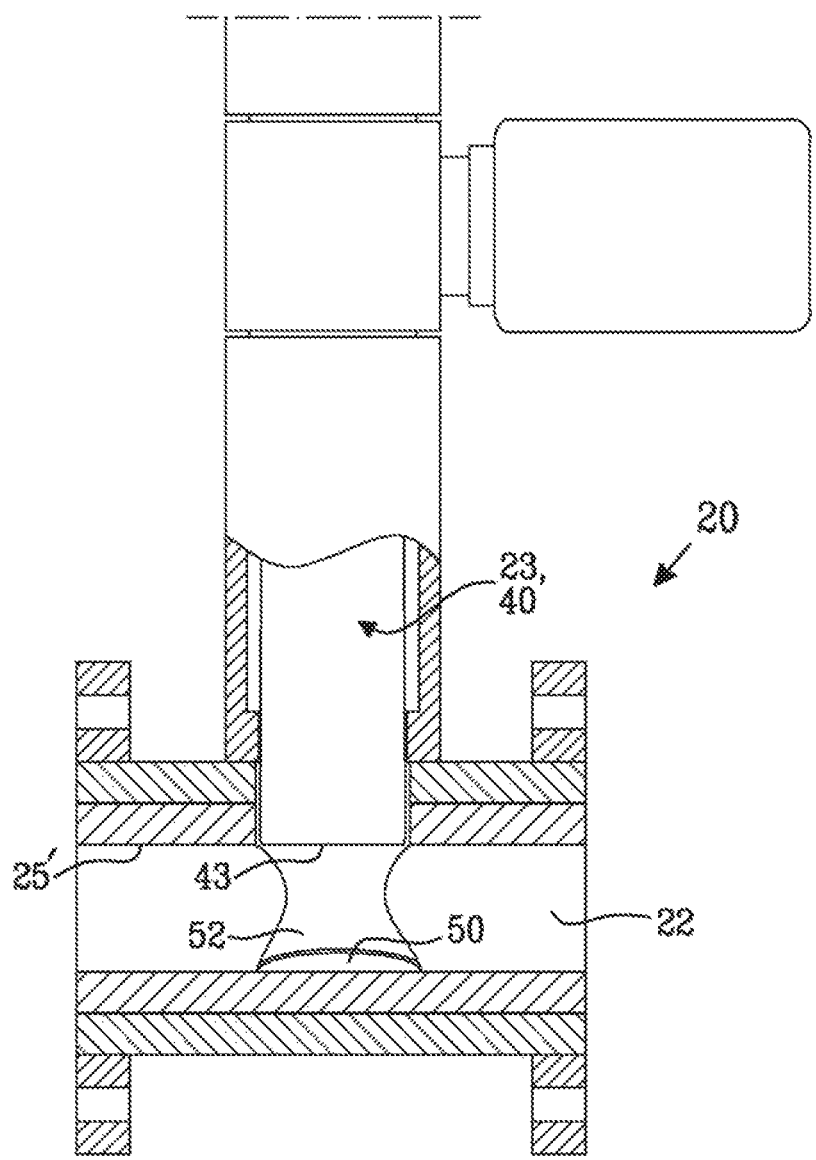
FIG. 5 is a cross sectional view of a discharge valve showing detachable inner lining in greater detail.

FIG. 5 shows a recessed mating surface 50 in greater detail. As can be gleaned from FIG. 5, the mating surface of the envelope wall 26 of the detachable inner lining 25 has a circular periphery with a diameter substantially corresponding to the diameter of the cylindrical body 40 so to permit the cylindrical body 40 to mate with the mating surface 50. FIG. 5 also shows a cut out 52 in the envelope wall 26 arranged so that the valve member 23 can properly close off the flow channel 22 of the detachable inner lining 25. The mating surface 50 can be arranged and formed directly in the inner envelope wall surface 25' if the end surface 43 of the valve member 23 is provided with a corresponding form. The recessed mating surface 50 and the cut out 52 in the envelope wall 26 as shown in FIG. 5 are optional features of a discharge valve as disclosed herein.

FIG. 6 shows a discharge valve 20 as disclosed herein with the valve member 23 in a service position. As disclosed herein, the valve member 23 may be arranged such that it can be moved completely out of the flow channel 22, to a position in which it is clear from the detachable inner lining 25. In the service position, the valve member 23 is moved in the displacement direction B until it is not only retracted from the flow channel 22 but moved away from the flow channel in the direction B, at least a further distance corresponding to the thickness of the envelope wall 26 of the detachable inner lining 25. When the valve member 23 is in the fully retracted service position, where it is clear from the detachable inner lining 25, the detachable inner lining 25 can be removed from the valve housing 21 without completely disassembling the discharge valve 20.

It should be noted that the above described discharge valve can be used with other process elements of a pulp manufacturing process and preferably mechanical pulping process but also in completely different manufacturing processes.

The invention claimed is:

1. A discharge valve comprising a valve housing connectable to a process element having a pressurized interior process volume, said discharge valve comprising a flow channel having a longitudinal center axis and a valve member in working cooperation with said flow channel, said flow channel being arranged to be in fluid communication with said pressurized interior process volume of said process element after connection thereto, said valve member comprising an insertion part being insertable in said flow channel by displacement of said valve member in a displacement direction at an angle ($\alpha$) to said longitudinal center axis and being a detachable inner lining at least partly forming said flow channel and having an envelope wall, wherein said detachable inner lining comprises an aperture extending through said envelope wall and through which said valve member is adapted to run when being displaced in said displacement direction, said detachable inner lining having a symmetrical form whereby said detachable inner lining is detachable from said valve housing, and insertable again after being turned 180°.

2. The discharge valve according to claim 1, wherein said angle ($\alpha$) is from 30-150 degrees.

3. The discharge valve according to claim 2, wherein said angle ($\alpha$) is from 45-135 degrees.

4. The discharge valve according to claim 3, wherein said angle ($\alpha$) is from 80-100 degrees.

5. The discharge valve according to claim 4, wherein said angle ($\alpha$) is about 90 degrees.

6. The discharge valve according to claim 1, wherein said valve member has the form of a cylindrical body, said cylindrical body having a circular cross section.

7. The discharge valve according to claim 1, wherein at least said insertion part of said valve member is substantially solid.

8. The discharge valve according to claim 1, wherein said detachable inner lining comprises a mating surface, wherein said valve member is adapted to be positioned to abut said mating surface of said detachable inner lining when said valve member is positioned in a fully closed position.

9. The discharge valve according to claim 8, wherein said mating surface is formed by a recess in said envelope wall of said detachable inner lining.

10. The discharge valve according to claim 9, wherein said recess of said mating surface is a recess having a circular periphery.

11. The discharge valve according to claim 1, wherein said valve member is displaceable in said displacement direction to a position in which it is clear from said detachable inner lining.

12. The discharge valve according to claim 1, wherein said process element is a process element in a manufacturing process involving processing of lignocellulosic material.

13. The discharge valve according to claim 12, wherein said valve housing is connected to a refiner, a reactor or a boiler.

14. The discharge valve according to claim 1, wherein said envelope wall of said detachable inner lining has a thickness of from 3-50 mm.

15. The discharge valve of according to claim 14, wherein said detachable inner lining has a thickness of from 10-40 mm.

* * * * *